(12) United States Patent
Takayanagi

(10) Patent No.: US 7,377,553 B2
(45) Date of Patent: May 27, 2008

(54) QUICK CONNECTOR

(75) Inventor: Akira Takayanagi, Iwakura (JP)

(73) Assignee: Tokai Rubber Industries, Ltd. (JP)

( * ) Notice: Subject to any disclaimer, the term of this patent is extended or adjusted under 35 U.S.C. 154(b) by 47 days.

(21) Appl. No.: 11/045,162

(22) Filed: Jan. 27, 2005

(65) Prior Publication Data

US 2005/0161942 A1    Jul. 28, 2005

(30) Foreign Application Priority Data

Jan. 27, 2004 (JP) .............................. 2004-019102

(51) Int. Cl.
*F16J 15/00* (2006.01)
*F16L 55/00* (2006.01)

(52) U.S. Cl. .................... 285/87; 285/93; 285/307; 285/319

(58) Field of Classification Search ................ 248/354; 279/77; 285/921, 87, 93, 305, 307, 319, 285/320

See application file for complete search history.

(56) References Cited

U.S. PATENT DOCUMENTS

| | | | | |
|---|---|---|---|---|
| 5,152,555 | A * | 10/1992 | Szabo | 285/93 |
| 5,395,140 | A * | 3/1995 | Wiethorn | 285/93 |
| 5,437,648 | A * | 8/1995 | Graves et al. | 604/263 |
| 5,649,724 | A * | 7/1997 | Wiethorn | 285/93 |
| D398,819 | S * | 9/1998 | Kondou | D8/14 |
| 5,897,145 | A * | 4/1999 | Kondo et al. | 285/93 |
| 6,145,886 | A * | 11/2000 | Ohta et al. | 285/4 |
| 2004/0108717 | A1* | 6/2004 | Matsubara et al. | 285/330 |

FOREIGN PATENT DOCUMENTS

| | | |
|---|---|---|
| JP | 03-68695 | 7/1991 |
| JP | 05-79184 | 10/1993 |
| JP | 11-013959 | 1/1999 |
| JP | 11-201355 | 7/1999 |
| JP | 2001-349487 | 12/2001 |

(Continued)

OTHER PUBLICATIONS

Patent Abstract of Japan for Japanese Patent Application Publication No. 2002-213673, published Jul. 31, 2002, and English translation.

(Continued)

*Primary Examiner*—James M Hewitt
*Assistant Examiner*—Jay R Ripley
(74) *Attorney, Agent, or Firm*—Andrus, Sceales, Starke & Sawall, LLP

(57) ABSTRACT

A quick connector has a connector housing, a tube connection component, a pipe body and a retainer. The quick connector further has a checking operation portion provided with a holding component. The holding component has a fitting hole and a gate component which is continuous with an opening end of the fitting hole. The holding component is adapted to cause the pipe body connected to the housing to fit in the fitting hole through the gate component in a snap-on manner and to connect with an outer circumference of the pipe body by rotary motion of the checking operation portion. The holding component is also adapted to be prevented from connecting with the outer circumference of the pipe body if the pipe body is not fully inserted into the connector housing.

4 Claims, 11 Drawing Sheets

FOREIGN PATENT DOCUMENTS

| JP | 2001349487 | * | 12/2001 |
| JP | 2002-005374 | | 1/2002 |
| JP | 2002-213673 | | 7/2002 |
| JP | 2002-276878 | * | 9/2002 |
| JP | 2002-317892 | | 10/2002 |
| JP | 2003-254484 | | 9/2003 |

OTHER PUBLICATIONS

Patent Abstract of Japan for Japanese Patent Application Publication No. 2003-254484, published Sep. 10, 2003, and English translation.

English translation of Notification of Reasons for Refusal; Patent Application No. 2004-019102; Mailed Jun. 6, 2007.

* cited by examiner

QUICK CONNECTOR

TECHNICAL FIELD

The present invention relates to a quick connector used, for example, for connecting gasoline fuel piping in automobiles. More specifically, it relates to a quick connector having a checking operation portion for checking the condition of a pipe body when inserted into the quick connector.

BACKGROUND TECHNOLOGY

A connector used for gasoline fuel piping in automobiles through which a pipe body and a resin tube, a female member, are connected, comprises: a tube connection component upstream along the axis; a cylindrical connector housing having a retainer holding component provided downstream along the axis thereof; and a retainer which is housed or held by a retainer holding component. The resin tube and pipe body are connected together, for example, by fitting the resin tube to the tube connection component and by inserting the pipe body to the connector housing from a downstream opening of the connector housing or retainer holding component to cause a snap-on fitting therebetween. The pipe body to be connected to the connector has an insertion end having an annular protruding flange on the outer circumferential plane. The insertion end is snapped onto the connector or connector housing by inserting the insertion end into the connector housing to cause the annular protruding flange to be snapped onto the pipe body engagement portion. An annular sealing member is provided on the inner circumferential plane of the connector housing to seal the space between the insertion end and the connector housing.

The pipe engagement portion may be, for example, an engagement slit circumferentially extending upstream along the axis of an annular or C-shaped retainer in cross-section along the axis. However, if the engagement slit is not handled with full care during connection, the insertion end of the pipe body may not be inserted completely into the retainer or connector housing, that is, the annular protruding flange may not be engaged with the engagement portion of the pipe body, for example, an engagement slit. As a result, a half-fitting condition may occur. The use of the connection configuration in which a connector and a pipe body are half-fitted usually causes fluid leakage because a sealing member does not seal the space between the connector and the pipe body sufficiently.

It is known to use a removable checker to check whether a pipe body is fitted into the quick connector sufficiently well. A removable checker for checking the connection comprises, for example: a checker body having a pulling component configured in parallel or substantially in parallel with the outer circumferential plane of a connector housing; and an engagement component formed integrally with the checker body or with both ends or both end portions of the checker body. Snapping of the engagement component into an engagement window formed on the connector housing causes the engagement component to be attached to one radial end of the connector housing in the locked state in which the engagement component cannot be pulled away. This is illustrated in Unexamined Japanese Patent Application Publication No. 2003-254484. The removable checker of this type is configured in such a manner that the normal fitting of a pipe body to the connector and the snap-on engagement between the annular protruding flange at the insertion end and a retainer cause the engagement component to be pushed aside by an annular protruding flange, which deforms or moves for example, in an outward radial direction, thereby allowing the removable checker to be pulled off. In this way, whether the connector and pipe body are connected normally or not can be confirmed by pulling the checker upon completion of connection operation. If the checker does not come away from the connector housing even when it is pulled, it is most likely that the pipe body is incompletely fitted thereinto; therefore, the connection procedure should be repeated such that the insertion end of the pipe body will be fully inserted into the connector.

A connector and a pipe body once connected may be disassembled and reconnected to permit, for example, maintenance service. In the connection checking configuration that utilizes a removable checker which is to be removed from the connector housing and withdrawn when the pipe body is connected normally, the connection of the pipe body cannot be confirmed when it is connected a second time. To overcome this problem, another connection checking configuration introducing a connection checking component with one end of the connection checking component connected to a connector housing by using a hinge; and with the other end of the connection checking component connected by a pin. If the pipe body is connected normally to a connector or connector housing is then determined by operating this connection checking component as described in Unexamined Japanese Patent Application Publication No. 2002-213673. When the pipe body is connected normally, the pin on the one end of the connection checking component can be engaged with a slot formed on the connector housing by rotating the connection checking component about this one end. The engagement of the pin with the slot allows the connection checking component to be held in parallel with the connector housing. Nevertheless, if the pipe body is not fully inserted into the connector housing, the pin on the connection checking component will not fit into the slot because the pin interferes with the annular protruding flange formed on the insertion end of the pipe body. Therefore, the insertion-connection status of the connector on the pipe body or connector housing can be determined by checking the engagement state between the connection checking configuration and connector housing. In this connection checking configuration, the pipe body can be pulled away relative to the connector by releasing the engagement between the pin and slot. In addition, the connection status of the pipe body can be checked when the pipe body is connected a second time by operating the connection checking component to cause the pin to be engaged with the slot even though the pipe body is connected a second time after it is pulled out.

Nonetheless, in the connection checking configuration utilizing a connection checking component connected to the connector housing with a hinge, an omission prevention measure cannot be implemented if the measure involves counting the checkers that are removed and the resulting count is used to confirm that connection operations are accurately provided at all required points.

SUMMARY OF THE INVENTION

The present invention is directed to a quick connector having a connection checking configuration that can be used repeatedly to check the connection condition and can also prevent an omission in checking.

The quick connector of the present invention comprises: a connector housing with a tube connection component provided upstream along the axis such that an insertion end of a pipe body can be inserted from the downstream opening along the axis; and a retainer provided downstream along the axis of the connector housing such that an annular protruding flange formed on the insertion end of the inserted pipe body is snapped onto the retainer to connect the insertion end with the retainer. The connector housing is adapted to permit a removable checker to be attached to a first radial end of the outer circumference. The quick connector further comprises: a checking operation portion wherein a first end thereof is rotatably connected to a second radial end of the outer circumference of the connector housing using a hinge with a second end thereof provided with a holding component; wherein rotary motion of the checking operation portion about the first end causes the holding component to fit to or to be engaged with the outer circumference of the pipe body connected to the connector housing or with a stopper component formed on the connector housing to receive the holding component. If the pipe body is not fully inserted into the connector housing, the holding component cannot be fitted or engaged with the outer circumference of the pipe body or with the stopper component of the connector housing. The term "along the axis" in the present application means in the axial direction of a connector housing, pipe body or said member.

The present invention provides a capability to check the connection of a pipe body in a quick connector by attaching a removable checker to the connector housing while preventing the omission of any check point. It also provides a capability to check the connection of a pipe body by utilizing a checking operation portion in place of a removable checker. The checking operation portion has a checking operation configuration comprising, an annular protruding flange on the insertion portion of a pipe body which is to be engaged with a retainer in a snap-on manner which can be used as a projection component that interferes with the checking operation portion. In addition, another type of projection component which is separate from the annular protruding flange may be used as the projection component that interferes with the checking operating portion.

The formation of a hinge bracket provided to a second radial end of the outer circumference of the connector housing and the capability of fitting a hinge connection component provided on a first end to the other end of the hinge bracket in a rotatable and removable manner, where a hinge connection component of a checking operation portion has a holding component, eliminates the need for a checking operation portion from the connection checking configuration that utilizes a removable checker. The unnecessary checking operations are thus eliminated.

If, for example, the resin tube connected to a connector is linked to the gasoline engine of an automobile, vibrations propagated from the gasoline engine to the connector via the resin tube cause the connector or connector housing to rotate constantly against the pipe body at a small angle. As a result, a sealing member provided between the connector or connector housing and a pipe body becomes worn out. This will cause the sealing performance between the connector and pipe body to deteriorate. For this reason, it is desirable that a rotary motion-locking means or rotary motion-locking configuration is provided to the connector-pipe body coupled body so as to prevent any relative rotary motion generated by the connector or connector housing against the pipe body. Such a rotary motion-locking configuration can be formed on the connector housing, retainer or holding component.

The rotary motion-locking configuration may be a rotary motion-locking concavity or rotary motion-locking slit formed on the connector housing or the retainer to be circumferentially engaged with a projection component provided on the pipe body. Alternatively, if the rotary motion-locking concavity or groove or rotary motion-locking engagement slit is provided to a retainer which is separate from the connector housing, the retainer should be attached to the connector housing in the rotary motion-locking mode.

The rotary motion-locking configuration may be a pair of flat portions provided on the holding component that can pinch a flat portion provided on radially symmetrical points on the outer circumferential plane of the pipe body.

The quick connector configuration of the present invention represents a quick connector when connected to a pipe body.

DESCRIPTION OF THE PREFERRED EMBODIMENTS

Embodiments of the present invention are described herein with reference to the drawings.

Figure 1:
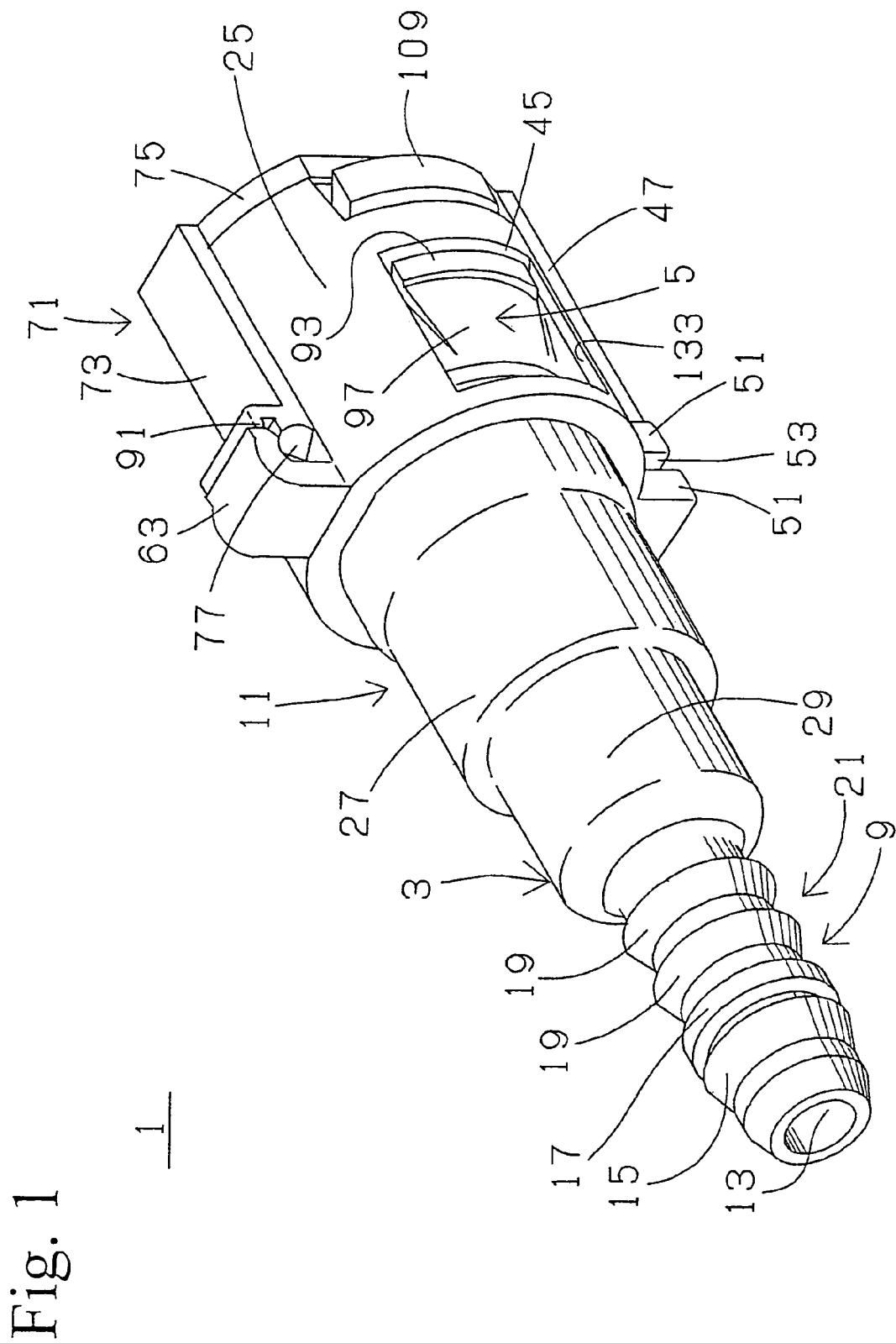
FIG. 1 is a perspective view of a first quick connector associated with the present invention.
Figure 2:
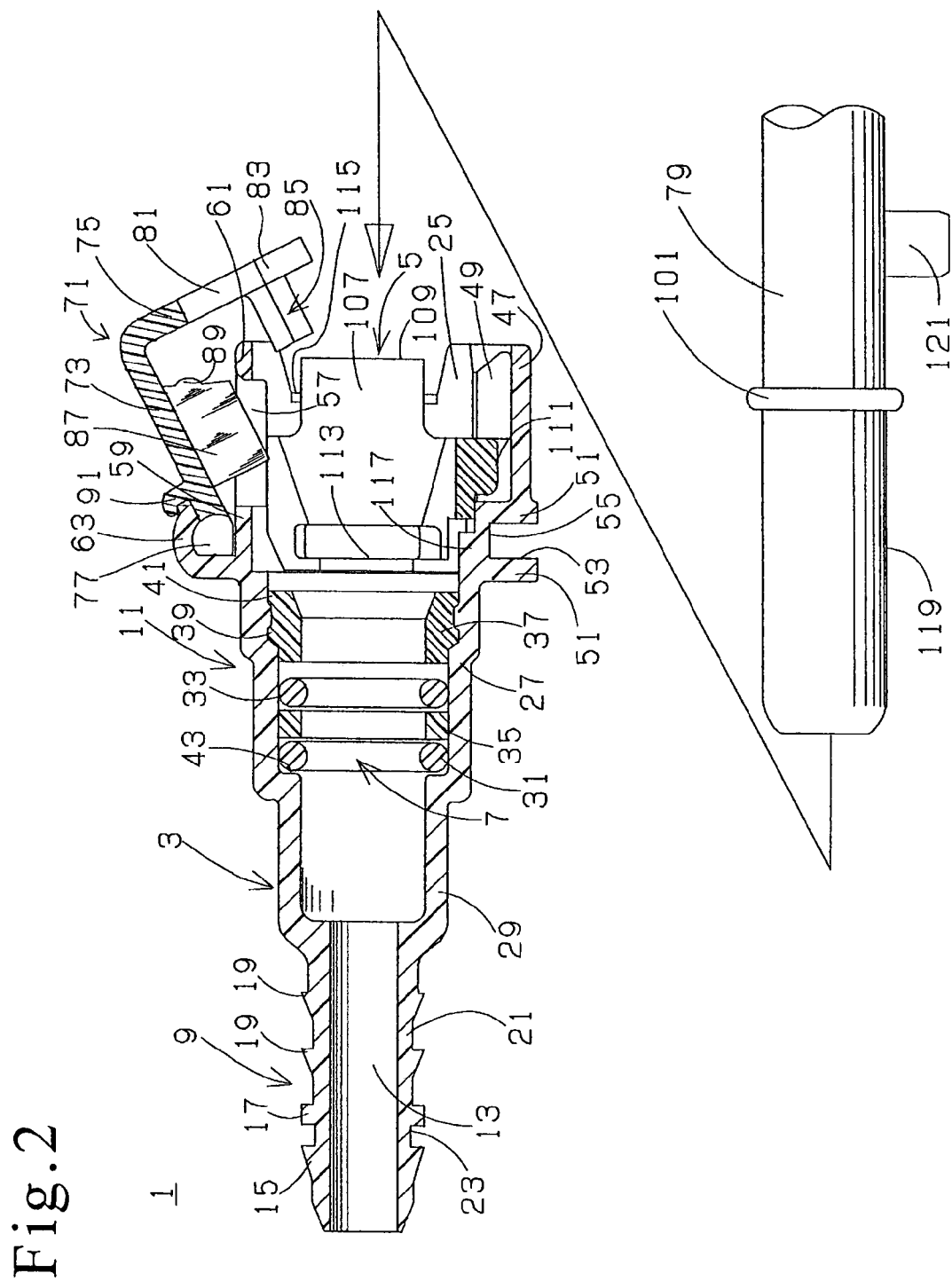
FIG. 2 is a diagram illustrating a first pipe body being inserted into the first quick connector thereof.
Figure 3:
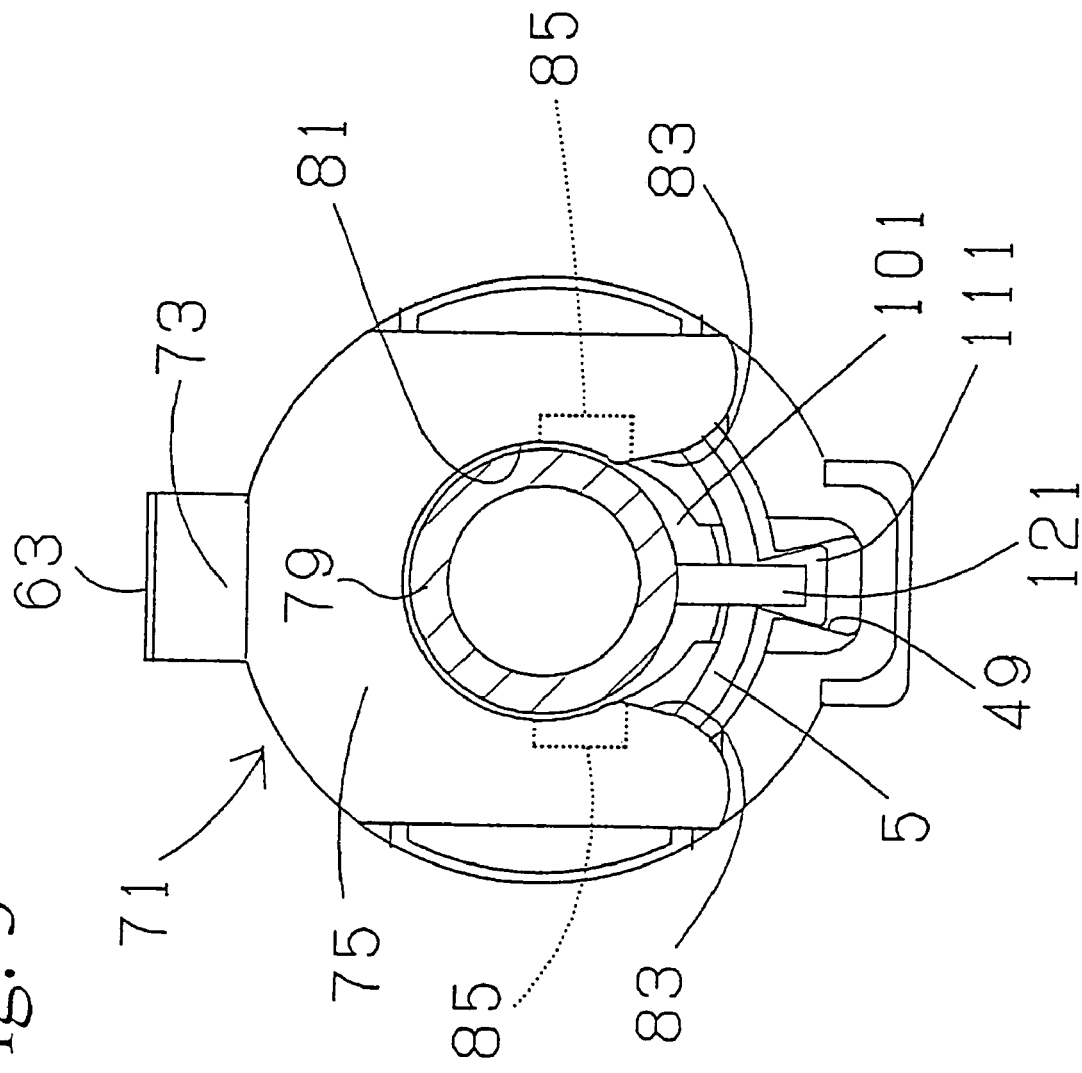
FIG. 3 is a side view of the first quick connector thereof.

The first embodiment of the quick connector 1 of the present invention ("first quick connector") is shown in FIG. 1 and is used for connecting gasoline fuel piping in automobiles. The first quick connector comprises: a cylindrical first connector housing 3; retainer 5 having a C-shaped cross-sectional view as is shown in FIG. 2 and has a sealing means 7. The first connector housing 3, is composed of glass fiber enhanced polyamide (PA-GF), and comprises: a cylindrical tube connection component 9 upstream along the axis; a substantially cylindrical pipe insertion portion 11 downstream along the axis; and a through-hole 13 that extends from the upstream side to the downstream side of the housing 3 along the axis. Resin tube connection component 9 comprises: upstream portion 15, whose outer circumferential plane is gradually expanding radially in the downstream direction along the axis; and downstream portion 21, which is a substantially cylindrical outer plane or outer circumferential plane onto which are formed annular protruding flange 17 having a rectangular shape in cross-section and two annular protruding flanges 19, 19 having a right-angled triangle in cross-section expanding in the downstream direction, one after another from upstream to downstream at intervals along the axis. A resin tube is tightly fitted to the outer circumference or outer circumferential plane thereof to connect the resin tube thereto. Upstream outer circumferential plane 23 of downstream portion 21 between upstream portion 15 and annular protruding flange component 17 is formed with a small diameter or is formed as a relatively deep groove. A seal ring (not illustrated) is placed on upstream outer circumferential plane 23 to fit the resin tube thereto.

Pipe insertion portion 11 of the first connector housing 3 comprises: a large-diameter retainer holding component 25 located downstream along the longitudinal axis of the housing 3, a seal-holding component 27 provided in the middle of the housing 3, and having a diameter which is smaller than the diameter of retainer holding component 25, and an upstream connection component 29 having a diameter smaller than that of seal holding component 27. The components 25, 27, and 29, are preferably integrally formed. An upstream first O-ring 31 and a downstream second O-ring 33 together constitute the sealing means 7 and are fitted to the upstream inner circumferential plane of seal holding component 27 at a distance along the axis via collar 35. A short cylindrical resin bushing 37 having an inner diameter substantially equal to the inner diameter of connection component 29 is fitted to the downstream inner circumferential plane of seal holding component 27. A resin bushing 37 having annular protruding flanges 39, 41 is formed integrally with the upstream and middle portions of the outer circumferential plane thereof in such a manner that the flanges 39, 41 protrude somewhat in the outward radial direction. The downstream inner circumferential plane of the seal holding component 27 is given a shape that corresponds to the outer circumferential plane of resin bushing 37. The first O-ring 31 and second O-ring 33 are aligned along the axis and are pinched between annular step surface 43 formed at the upstream end inside seal holding component 27 and resin bushing 37. The first O-ring 31 is made of, for example, a fluorine rubber (FKM) having excellent resistance against water, dust, gasoline, and ozone whereas the second O-ring 33 is made of, for example, fluorosilicone rubber (FVMQ) having excellent resistance against water, dust, low temperature, and ozone.

Retainer engagement windows 45, 45 are formed face-to-face with radial symmetry over substantially the cylindrical retainer holding component 25 of the pipe insertion portion 11. A thin or relatively thin expanding component 47, extends downstream along the axis from a point beyond the center of the retainer holding component 25, and is formed at the mid-point on the circumference or widthwise mid-point at one radial end of the circumferential plane defined by retainer engagement windows 45, 45. A key 49, having a trapezoidal shape in cross-section and which expands in the outward radial direction is formed at the point of the expanding component 47 extending from the downstream to the upstream or the upstream portion of expanding component 47 on the inner circumferential plane of retainer holding component 25. A downstream rotary motion-locking concavity is formed in such a manner that it gradually widens in the downstream direction along the axis. A pair of projections 51, 51, extending in a direction perpendicular to the axis, is formed upstream along the axis of expanding component 47 wherein downstream projection 51 is formed continuously or integrally with upstream expanding component 47. Bottom plane 55 of fitting groove 53 between pair of projections 51, 51 is given a flat configuration or is formed flat.

Checking of window 57 is provided on the downstream circumferential wall defined by retainer engagement windows 45, 45. More specifically, it is located somewhat more downstream than the retainer engagement window 45. On both ends of checking 57 along the axis, the circumferential walls of retainer holding component 25 are given plate-like shapes or at least the outer planes thereof have plate configurations that give plate components 59, 61; on upstream plate component 59 along the axis, bracket 63 or a hinge bracket protruding outward is formed integrally with substantially the entire width of plate component 59. Bracket 63 comprises: base component 65 slightly projecting outward in a direction perpendicular to the axis from the upstream outer plane of plate component 59; and circular component 67 provided on the outer end of base component 65 pointing downstream, thereby providing a hook-like configuration. Projection component 69 is formed integrally with the downstream end or opening end of circular component 67 in such a manner that projection component 69 slightly extends in the downstream direction being inclined radially outward.

Figure 4:
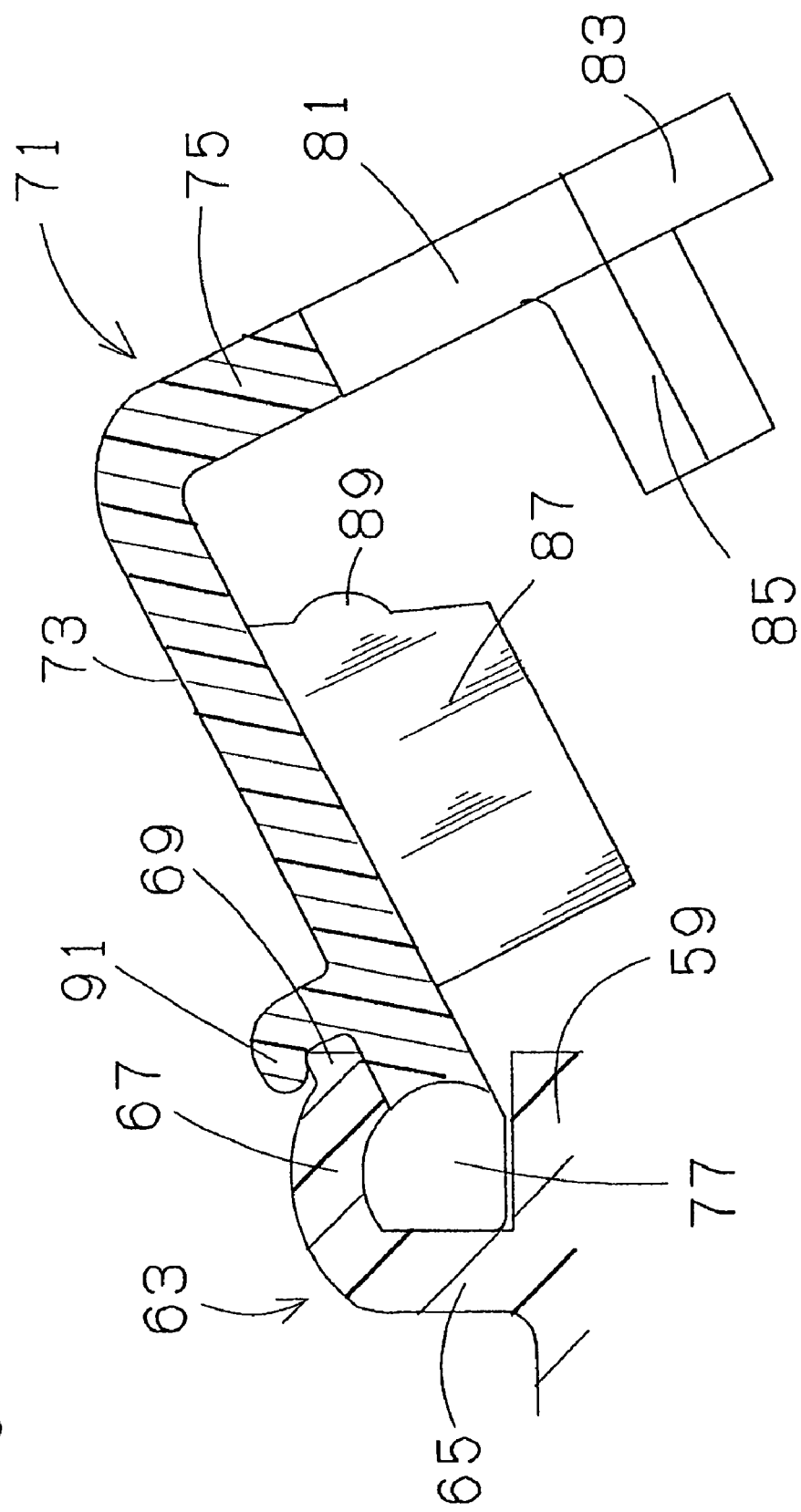
FIG. 4 is a magnified view of the connection checking lid portion.

One end of a connection checking lid 71 which is located on the downstream end of the connector housing 3 defines a checking portion and is rotatably fitted to a rotary shaft component 77 in bracket 63 as shown in FIG. 4. Connection checking lid 71 comprises: blocking component 73 and holding component 75 formed integrally with a bent second end of blocking component 73 to form a right angle, thereby providing an L-shaped or cross-sectional L-shape configuration. Rotary shaft component 77 or a hinge linking component is fitted to bracket 63 formed integrally with a first end of blocking component 73. Rotary shaft component 77 is given a fan-like configuration with a center angle of 90° in cross-section and is pushed into bracket 63 through an opening in bracket 63. The opening in bracket 63 gradually widens in the outward direction thereof as shown in FIG. 4 due to projection 69 formed on circular component 67, allowing rotary shaft 77 to fit to bracket 63 relatively easily.

Blocking component 73 of connection checking lid 71 is formed in a rectangular shape with substantially the same length as retainer holding component 25 and substantially the same width as checking window 57. Holding component 75 is a C-shaped plate whose tip is open and whose outer circumference at one end forms an arc of somewhat over 180°, wherein the outer circumference of holding component 75 is in parallel contact with or substantially in contact with the opposite outer circumferential end along the axis of retainer holder 25. Holding component 75 comprises: a fitting hole 81 having the same diameter as the outer diameter of the first pipe body 79; and a gate component 83 having a width which gradually widens toward the tip and is continuous with the opening end of the fitting hole 81. An auxiliary engagement component 85 extends in the upstream direction on the back or upstream side along the axis of holding component 75 such that the inner plane thereof contacts gate component 83 in parallel. More specifically, the inner plane contacts the open end of fitting hole 81 and the gate component 83 in parallel. A thick plate-like projection component 87 for checking is formed integrally with the inner plane side of blocking component 73 at a middle point in the width direction such that projection 87 for checking has a longitudinal length substantially equal to that of checking window 57. The other end or tip portion of checking projection component 87 is inclined along the axis in the upstream direction pointing inwardly and is formed integrally with a locking projection 89 protruding somewhat outwardly in the downstream direction along the axis.

Connection checking lid 71 can be rotated in an opening direction until blocking component 73 touches the open end (open position) of the arc component 67 of bracket 63. The connection checking lid 71 can also be rotated in a closing direction until blocking component 73 closes checking window 57 and touches plate components 59, 61 which defines the closed position of retainer holding component 25, that is, until blocking component 73 contacts in parallel the outer circumferential plane or closing position of retainer holder 25. As blocking component 73 rotates to the closed position, the checking projection component 87 pops out from the checking window 57 to the inside of retainer holding component 25. More specifically, the checking projection component 87 pops out of the inside retainer holding component 25 until it comes into proximity with the outer circumferential plane of piping body 79. A locking projection 89 is snapped onto the upstream inner plane of flat component 61 which works as a stopper component (hereafter stopper component) for locking projection 89. The flat component 61 is formed on the housing and is located downstream along the axis of retainer holding component 25. The holding component 75 contacts the downstream open end of retainer holding component 25 in parallel. Rotary shaft component 77 of connection checking lid 71 and bracket 63 are fitted to each other in a cross-sectional configuration at the open position, thereby providing stability for rotary shaft component 77 and bracket 63. Accordingly, connection checking lid 71 will not rotate when in the open position easily. To enhance the holding capability of the connection checking lid in the open position, holding projection 91 is snapped into engagement with the checking projection component 69 of circular component 67 in bracket 63 which is formed integrally with the frontal plane side of blocking component 73, as shown in FIG. 4 such that circular component 67 and holding projection 91 make a snap-on engagement when in the open state.

Figure 5:
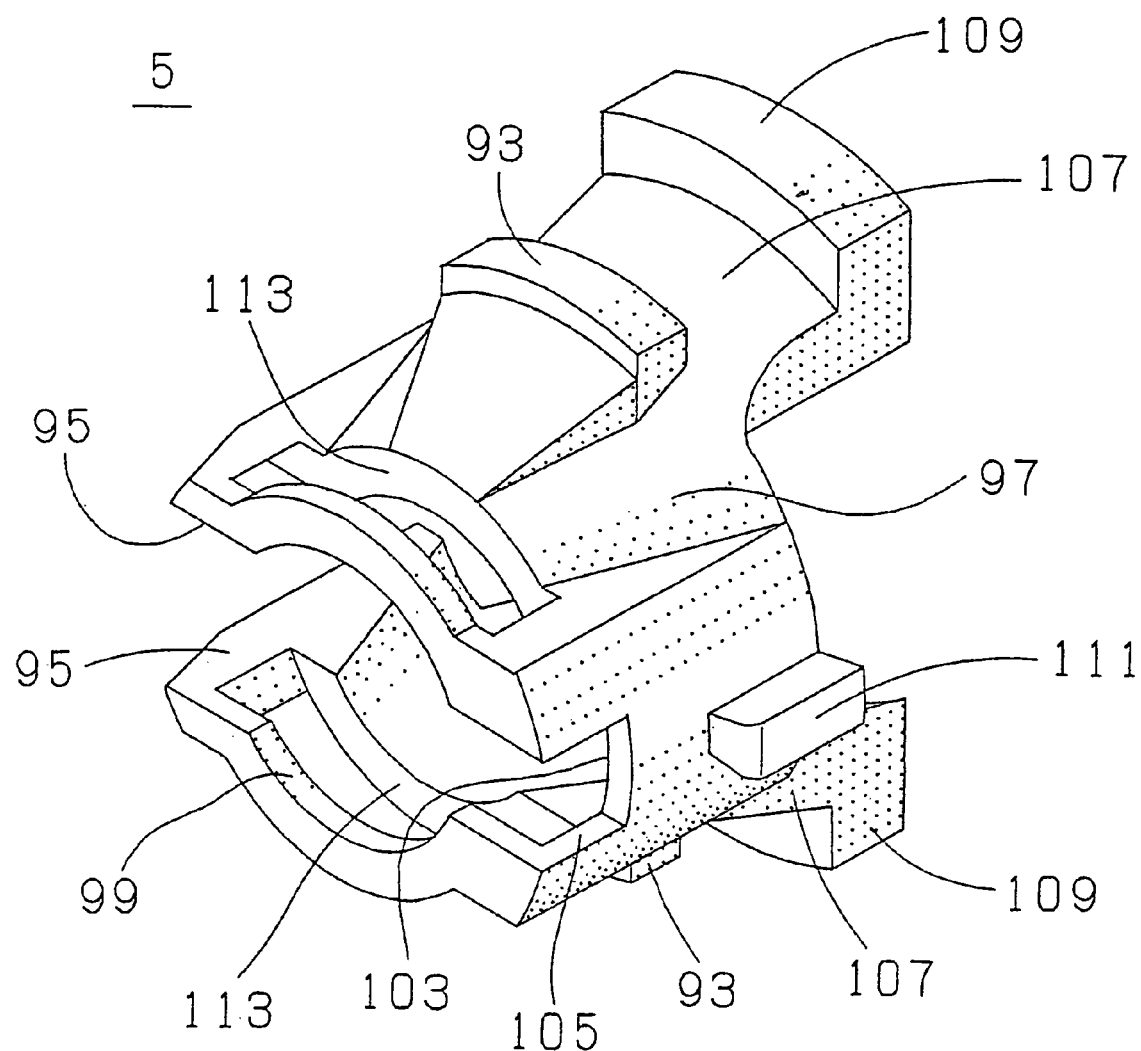
FIG. 5 is a perspective view of a retainer.

As illustrated in FIG. 5, retainer 5 is composed of polyamide (PA) and is housed in the retainer holding component 25 to which it is fitted. Retainer 5 is relatively flexible and elastically deformable. Retainer 5 has a C-shaped body component 97 in cross-section with a relatively large gap for accommodating any deformation generated between circumferential edges 95, 95; on body component 97. A pair of locking pins 93, 93 project radially outwardly and are formed with radial symmetry in the downstream direction. The inner plane of body component 97 has a diameter which decreases in the upstream direction along the longitudinal axis except for the portion that faces circumferential edges 95, 95 and which forms a deformation gap. The upstream portion 99 of the body component 97 has substantially the same inner diameter as that of the body of first pipe 79 (without annular protruding flange 101), except for the portion facing circumferential edges 95, 95 which forms a gap for deformation and has a smaller inner diameter than the diameter of the annular protruding flange 101. Inner plane 103 of the portion facing the gap for deformation generated in body component 97 is a cylindrical inner plane with some concavity. Upstream portion 99 of body component 97 facing the gap for deformation has a notch-like concavity 105.

Upstream body component 97 of retainer 5 is formed integrally with a pair of operating arms 107, 107 and extend downstream along the axis from the points corresponding to locking pins 93, 93 and are inclined radially outwardly. Operating ends 109, 109, which project radially outwardly, are provided to operating arms 107, 107. Locking protrusion 111, which is a short extension along the axis, is provided to the downstream outer plane of the portion facing the gap 111 for deformation of body component 97. The locking protrusion 111 has a rectangular shape in cross-section and is of the same thickness as the locking concavity 49 (a trapezoidal shape in cross-section expanding toward the outside). Engagement slits 113, 113 engage pipe body 97 and extend along the circumference thereof in a face-to-face manner with upstream portion 99. Retainer 5 thus configured is pushed into retainer holding component 25 and fitted thereto in the following manner: locking protrusion 111 slides in the upstream direction along the axis of rotary motion-locking concavity 49 to be fitted thereto; engagement pins 93, 93 enter retainer engagement window 45, 45 of retainer holding component 25; operating ends 109, 109 are housed in housing concavities 115, 115 formed with radial symmetry on downstream retainer holding component 25 such that housing concavities 115, 115 correspond to retainer engagement windows 45, 45. In the Figures, Reference Numeral 117 is a rotary motion-locking convexity, which is formed integrally with the inner circumferential plane of retainer holding component 25 so as to lock the rotary motion of retainer 5 by staying in notch-like concavity 105 of body 97 thereof.

Retainer 5 is kept from falling due to the engagement between engagement pin component 93 and downstream retainer engagement window 45. Retainer 5 is kept from rotary motion generated against first connector housing 3 or retainer holding component 25 due to the engagement between engagement pins 93, 93 and circumferential ends of retainer engagement windows 45, 45, and the engagement between rotary motion-locking convexity 117 and the notch-like concavity 105 on retainer 5. Since locking protrusion 111 is locked into rotary motion-locking concavity 49 circumferentially, the circumferential engagement provides the kind of rigidity and accuracy required for preventing any rotary motion.

Figure 6:
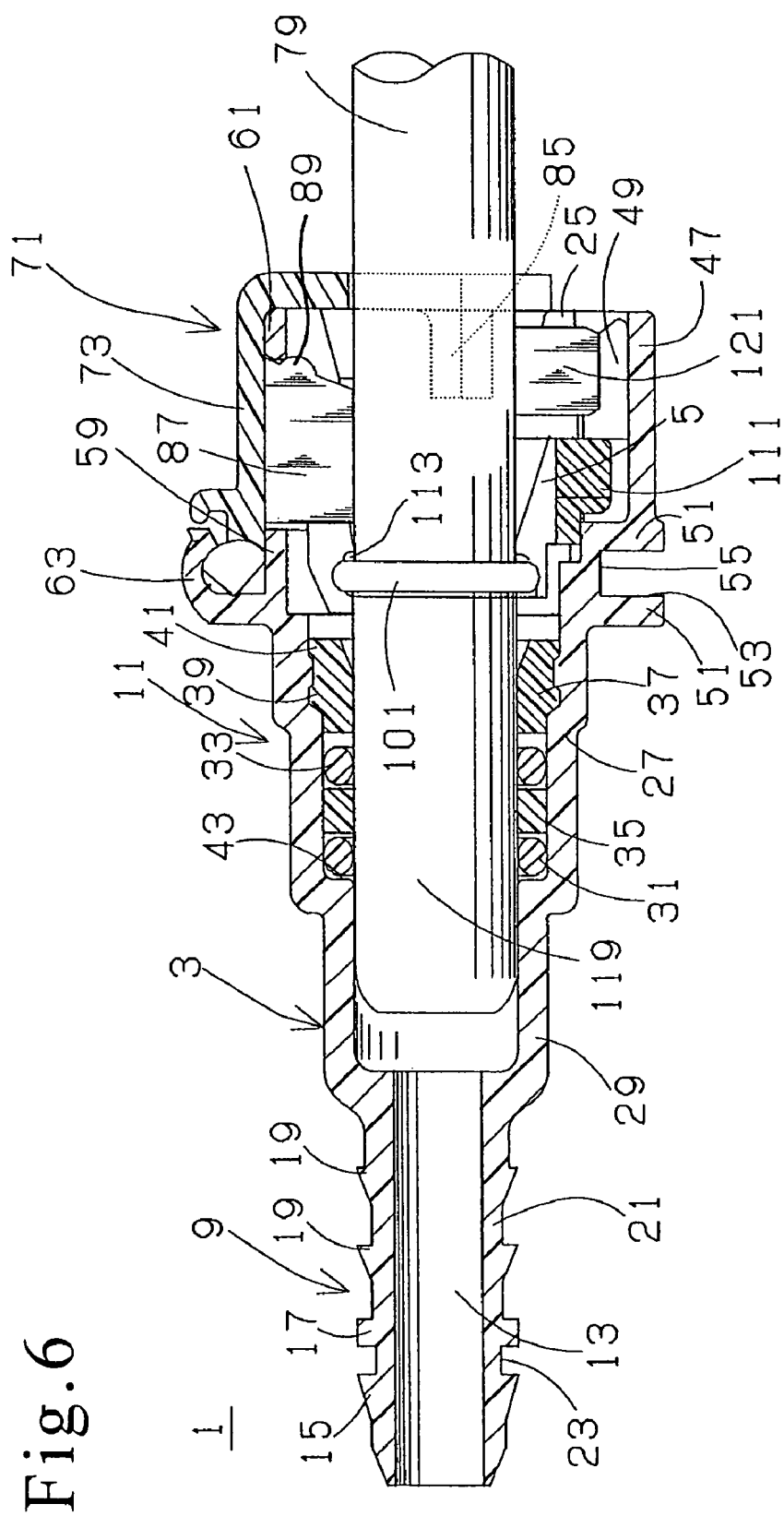
FIG. 6 is a cross-sectional view of a first quick connector being connected with first pipe body.

A male first pipe body 79 is to be fitted into the first quick connector 1 upon insertion from the downstream opening end of the retainer holding component 25. More specifically, the male pipe body 79 is inserted from the operating ends 109, 109 on operating arms 107, 107 into body 97 of retainer 5. This male pipe body 79, for example, is made of a metallic material and has an inserting end 119 and an annular protruding flange 101 provided on the upstream outer circumferential plane as is illustrated in FIG. 6. The male pipe body 79 is pushed into first connector housing 3 while annular protruding flange 101 expands body component 97 of retainer 5 until annular protruding flange 101 is fitted into engagement slits 113, 113 to provide a snap-on connection thereto. Insertion end 119 has plate-like key 121 more toward downstream than annular protruding flange 101; first pipe body 79 is inserted into first connector housing 3 such that key 121 is inserted into rotary motion-locking concavity 49 to stop rotary motion. Key 121 has a width or thickness substantially equal to the width of rotary motion-locking concavity 49, i, e., substantially equal to the width of the radial inner end of the rotary motion-locking concavity 49. The first pipe body 79 is kept from falling from first quick connector 1 and its insertion to first quick connector 1 stops as annular protruding flange 101 fits engagement slits 113, 113 of body component 97 of retainer 5. In other words, first pipe body 79 is aligned along the axis. Upstream first pipe body 79 reaches connection component 29 by running over first O-ring 31 and second O-ring 33 provided inside sealing retaining component 27 such that the space between first pipe body 79 and first connector housing 3 is sealed by O-rings 31, 33.

If first pipe body 79 is inserted into the first quick connector 1, connection checking lid 71 is rotated until it reaches the closed or closing position. If connection checking lid 71 rotates to the closing position, holding component 75 engages the outer circumference of first pipe body 79 in a snap-on manner while being housed by fitting hole 81. Connection checking lid 71 is kept at the closing position by the snap-on connection between holding component 75 and first pipe body 79, by another snap-on connection between locking pin 89 provided on checking projection component 87 and plate component 61 of retainer holding component 25, and by the bite connection between rotary shaft component 77 and the angled portion of inner plane of bracket 63.

If first pipe body 79 is not fully inserted into retainer 5, and annular protruding flange 101 is positioned within the axial direction of checking window 57 without being engaged with engagement slit 113, connection checking lid 71 cannot be rotated all the way to the closed or closing position because projection component 87 for checking touches annular protruding flange 101. As a result, holding component 75 does not engage first pipe body 79 or locking pins 89 will not snap onto plate component 61 of retainer holding component 25. The connection conditions of first pipe body 79 can thus be checked by trying to rotate connection checking lid 71 all the way to the closed or closing position or by seeing whether connection checking lid 71 can be kept at the closed or closing position, i.e., is not rotatable back into the open position.

Figure 7:
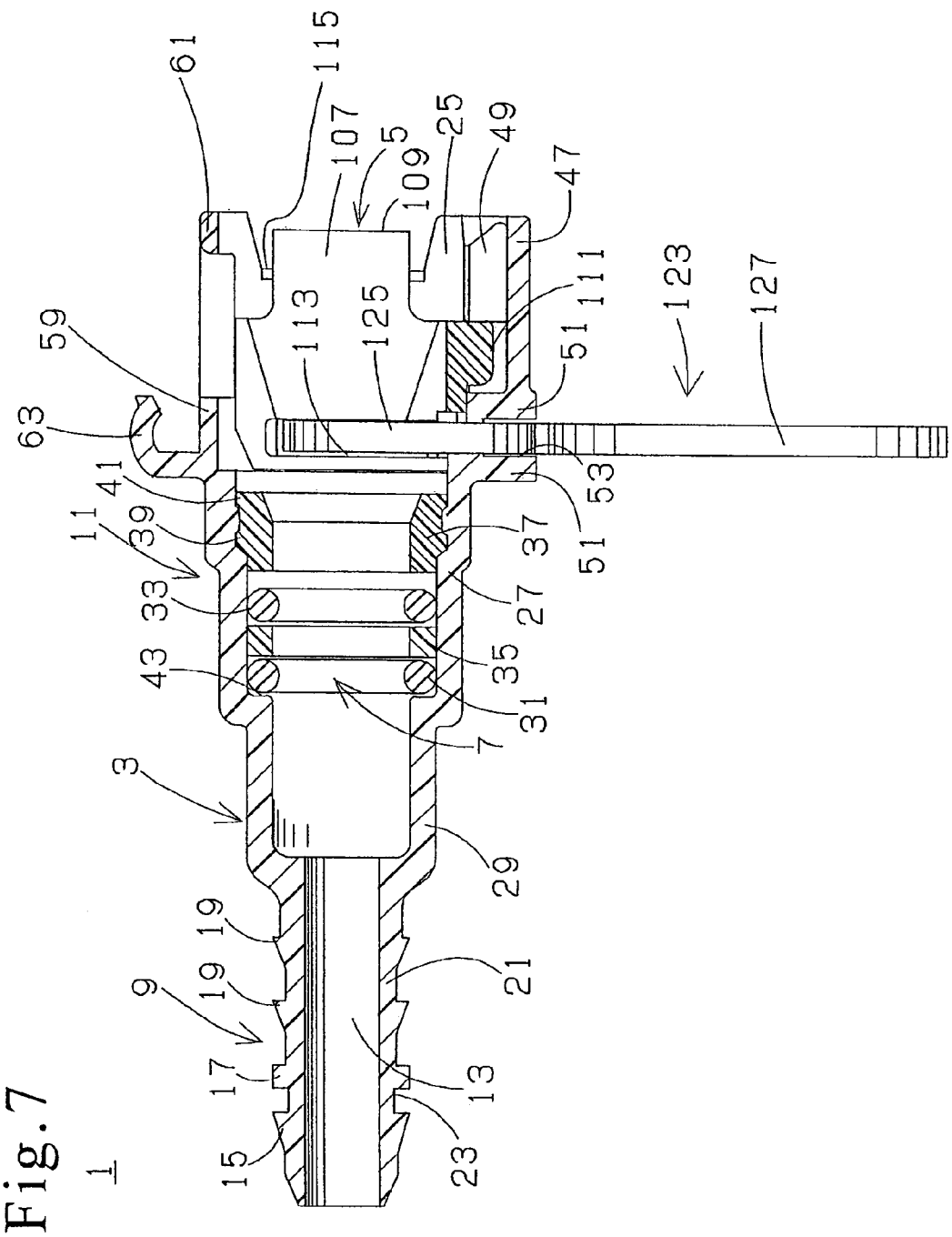
FIG. 7 is a cross-sectional view of a first quick connector having another configuration.
Figure 8:
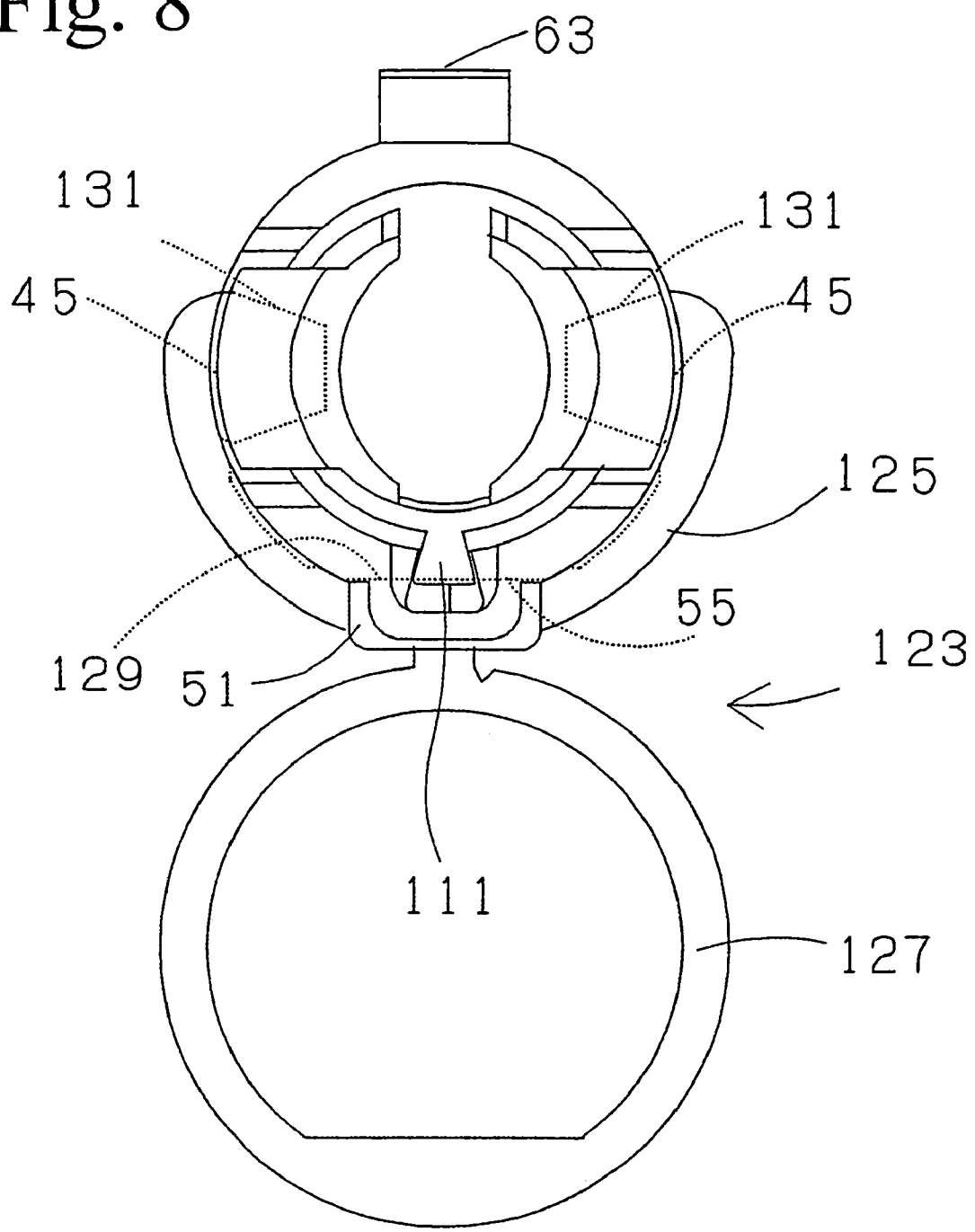
FIG. 8 is a side view of a second quick connector having another configuration.

FIG. 7 is a cross-sectional view illustrating another configuration of first quick connector 1. FIG. 8 is a side-view illustrating another configuration of first quick connector 1.

Checker 123, which is a removable checkers is made of polyacetal (POM) and is attached at one radial end to the outer circumference or outer circumferential plane of the first connector housing 3. Checker 123 is relatively flexible and elastically deformable. Checker 123 includes checker body 125, which is a thin circular body having substantially the same diameter as the outer circumference of first connector housing 3. Pulling ring 127 is formed integrally with the outside portion or the widthwise center of the outer circumferential portion of checker body 125. A flat linear portion 129 is formed on the inner plane or inner circumferential plane of the checker body 125. The flat linear portion 129 has a length substantially equal to the width of bottom plane 55 of fitting groove 53, which is provided on the outer circumferential plane of retainer holding component 25. Inward engagement components 131, 131, protruding in the width direction or radially inside, are formed integrally with widthwise ends of checker body 125 along the width.

Checker 123, thus configured, is attached to one radial end of the outer circumferential plane of first connecter housing 3 in parallel therewith. The flat portion 129 is fitted to fitting groove 53 between locking protrusions 51, 51, which are provided on the outer circumferential plane of first connector housing 3, and at the same time, inward engagement components 131, 131 enter retainer engagement windows 45, 45 to be engaged with circumferential ends 133, 133 (see FIG. 1 for one end) of retainer engagement windows 45, 45. Now, ring 127 will not come off even though it is pulled away because inward engagement component 131 and circumferential one end 133 of engagement window 45 are engaged with each other.

In this figure, the connection-checking lid 71 has been omitted from the bracket 63.

Insertion of first pipe body 79 into first connector housing 3 causes annular engagement component 101 of pipe body 79 to enter engagement slits 113, 113 by pushing inward engagement components 131, 131 of checker 123 aside. The insertion-connection of pipe body 79 causes engagement components 131, 131 to deform and move i.e., push radially outwardly, thereby releasing the engagement between inward engagement components 131, 131 and circumferential ends 133, 133 of retainer engagement window 45, 45. As such, pulling ring 127 causes checker 123 to come away from first connector housing 3. In this way it can be confirmed whether first pipe body 79 is connected normally or not.

Figure 9:
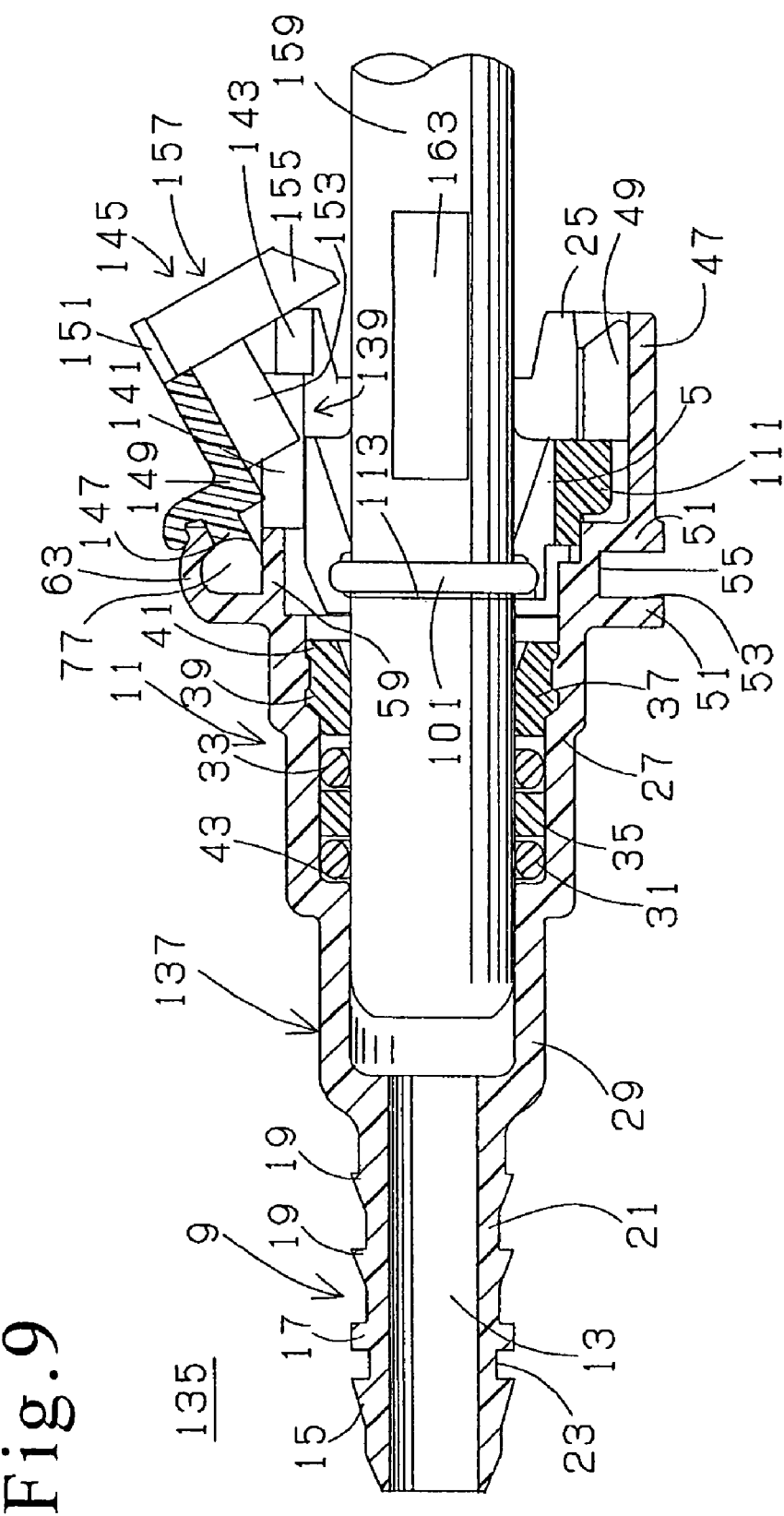
FIG. 9 is a cross-sectional view of a second quick connector of the present invention connected to a second pipe body.
Figure 10:
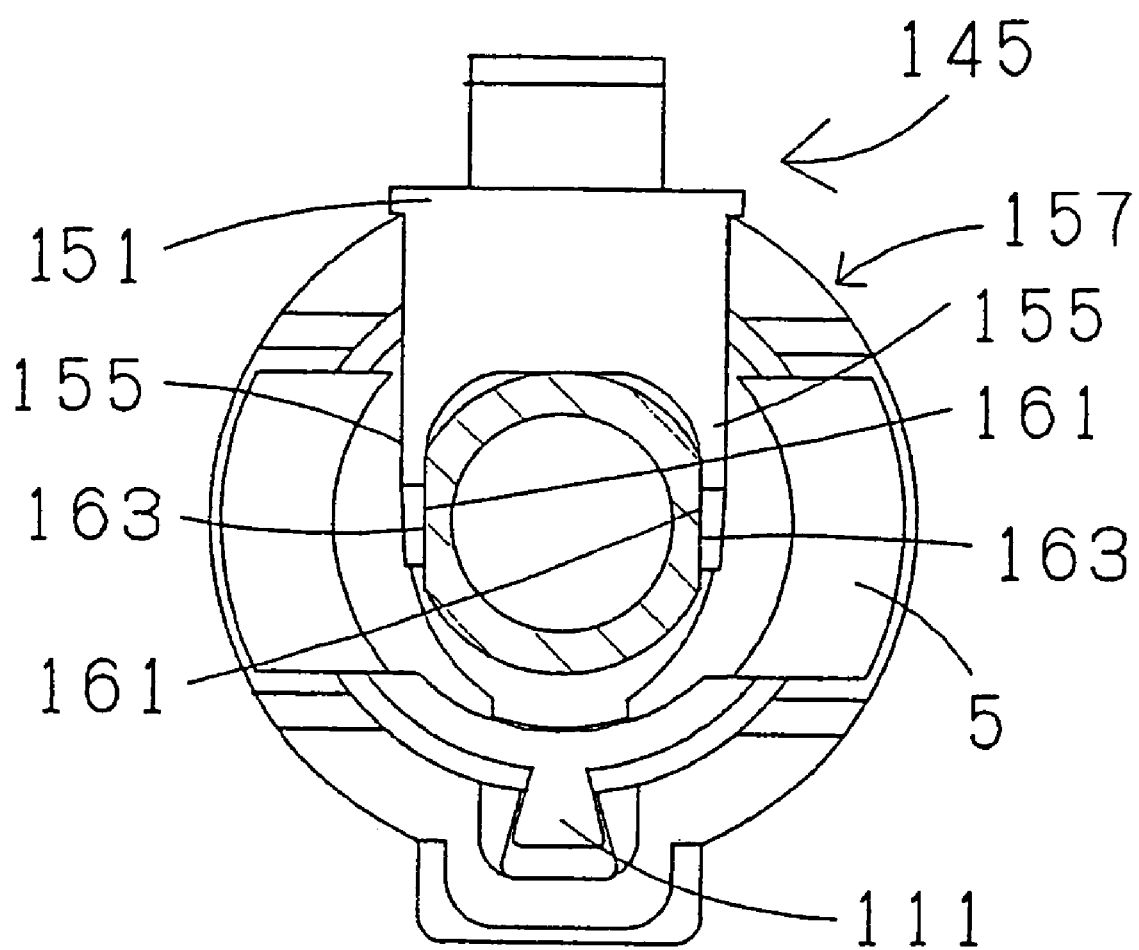
FIG. 10 is a side view of a second quick connector connected to a second pipe body.
Figure 11:
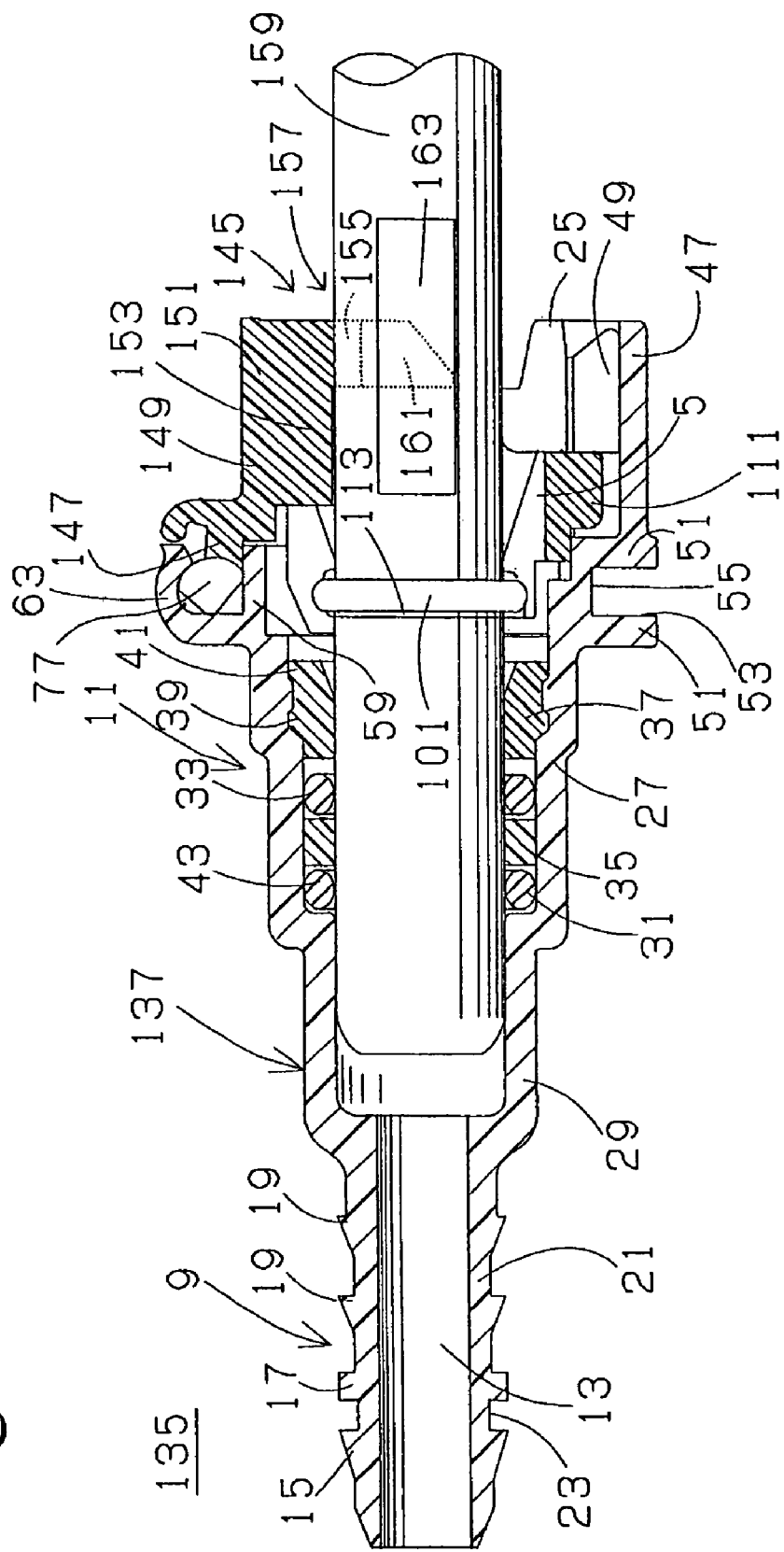
FIG. 11 is a cross-sectional view of a second quick connector connected to a second pipe body.

FIG. 9 is a cross-sectional view of a second embodiment of the quick connector of the present invention ("second quick connector") and is connected to a second pipe body.

The second quick connector 135 is a modified version of the first quick connector 1 shown in FIG. 1. Therefore, the components having the same function and structure as those of first quick connector 1 are not given Reference Numerals and are not described. The connection-checking lid 71 of the second quick connector 135, has a modified configuration from that of its counterpart in the portion of first connector housing 3 of first quick connector 1. Moreover, in the second connector housing 137 of the second quick connector 135, the checking window 139 comprises: an upstream checking window component 141 and a rotary motion engagement window portion 143 which is provided upstream of the checking window portion 141 along the axis. Accordingly, the rotary motion-locking window portion 143 is somewhat wider than checking window component 141 and reaches downstream to the retainer holding component 25. Connection checking lid 145 comprises: a root portion 147 having rotary shaft 77 to be fitted into bracket 63; checking lid component 149 provided one step inside downstream from root portion 147; and rotary motion-locking component 151 provided downstream from checking lid component 141. Checking lid component 149 has substantially the same width and length as checking window component 141 such that checking lid component 149 fits into checking window component 141 as connection checking lid 145 rotates to the closing position. Rotary motion-locking lid portion 151 has the same length and has somewhat larger width than rotary motion engagement window component 143. As a result, as connection checking lid 145 rotates to the closing position, both widthwise ends are placed on the widthwise ends of rotary motion-locking window component 143.

A thick plate-like checking projection component 153 having a thick portion at the widthwise mid-point is formed on the inner plane side of checking lid component 149. Pinching projection component 157 represents a holding component having a pair of projection components widthwise on both ends and is provided on the inner plane side of rotary motion-locking lid component 151. A flat portion 161 is provided to each pinching projection component 155 such that the flat portion 161 is arranged at a FIG. 9 is a cross-sectional view of a second embodiment of the quick connector of the present invention ("second quick connector") and is connected to a second pipe body.

The second quick connector 135 is a modified version of the first quick connector 1 shown in FIG. 1. Therefore, the components having the same function and structure as those of first quick connector 1 are not given Reference Numerals and are not described. The connection-checking lid 71 of the second quick connector 135, has a modified configuration from that of its counterpart in the portion of first connector housing 3 of first quick connector 1. Moreover, in the second connector housing 137 of the second quick connector 135, the checking window 139 comprises: an upstream checking window component 141 and a rotary motion engagement window portion 143 which is provided upstream of the checking window portion 141 along the axis. Accordingly, the rotary motion-locking window portion 143 is somewhat wider than checking window component 141 and reaches downstream to the retainer holding component 25. Connection checking lid 145 comprises: a root portion 147 having rotary shaft 77 to be fitted into bracket 63; checking lid component 149 provided one step inside downstream from root portion 147; and rotary motion-locking component 151 provided downstream from checking lid component 141. Checking lid component 149 has substantially the same width and length as checking window component 141 such that checking lid component 149 fits into checking window component 141 as connection checking lid 145 rotates to the closing position. Rotary motion-locking lid portion 151 has the same length and has somewhat larger width than rotary motion engagement window component 143. As a result, as connection checking lid 145 rotates to the closing position, both widthwise ends are placed on the widthwise ends of rotary motion-locking window component 143.

A thick plate-like checking projection component 153 having a thick portion at the widthwise mid-point is formed on the inner plane side of checking lid component 149. Pinching projection component 157 represents a holding component having a pair of projection components widthwise on both ends and is provided on the inner plane side of rotary motion-locking lid component 151. A flat portion 161 is provided to each pinching projection component 155 such that the flat portion 161 is arranged at a widthwise distance that is somewhat smaller than the outer diameter of second pipe body 159. The distance between the pair of pinching projection components 155, 155 are relatively wide.

The second quick connector 135 to be inserted into retainer holding component 25 of the second pipe body 159 has flat portions 163, 163 with radial symmetry in place of rotary motion-locking component 121. Other configurations remain the same as those found in first pipe body 79.

Second pipe body 159 is inserted into second connector housing 137 and connection checking lid 145 is rotated to the closing position in the same manner as was done for first quick connector 1. If connection checking lid 145 rotates to the closing position, pinching component 157 pinches flat portion 159 of second pipe body 163 at both ends with the flat plane portion of pinching projection component 155. In this way, second pipe body 159 will not rotate and connection checking lid 145 will be held at the closing position because pinching component 157 pinches second pipe body 159 and the angular portion of rotary shaft 77 bites into the inner plane of bracket 63.

If second pipe body 159 is not fully inserted into retainer 5 and annular locking projection component 101 is positioned within the axial direction of checking window 139 without being engaged with engagement slit 113, connection checking lid 145 does not rotate to the closing position because checking projection component 153 or pinching component 157 touches annular locking projection component 101. Pinching component 159 and second pipe body 159 thus cannot be engaged with each other. The connection status of second pipe body 159 can be checked by checking whether connection checking lid 145 can be rotated to the closing position or by checking whether connection checking lid 145 can be held at the closing position.

In second quick connector 135, connection checking lid 145 can be removed from bracket 63 and checker 123 can be attached in the same manner as with first quick connector 1.

What is claimed is:

1. A quick connector comprising:
    a connector housing having an upstream and downstream end with an opening at the downstream end thereof and having an outer circumference with a first and second radial end,
    a tube connection component provided upstream along the longitudinal axis of the connector housing; a pipe body having an insertion end adapted to be fully inserted into the opening at the downstream end of the connector housing;
    a retainer provided downstream along the longitudinal axis of said connector housing;
    an annular protruding flange formed on said insertion end of said pipe body with said flange adapted to be snapped into said retainer to connect said insertion end to said retainer; with
    said connector housing being configured in such a manner that a removable checker can be attached to said first radial end of the outer circumference;
    said quick connector further comprising:
    a checking operation portion having a first end connected to the second radial end of the outer circumference of said connector housing and having a second end provided with a holding component, the checking operating portion including a checking projection component that pops into a checking window provided in the second radial end of the connector housing to the inside of the connector housing by rotary motion of said checking operation portion about its first end, the holding component having a fitting hole having a generally same diameter as an outer diameter of the pipe body and a gate component which is continuous with an opening end of the fitting hole;
    wherein:
    the holding component snap-fits on the outer circumference of said pipe body connected to said housing by the rotary motion of said checking operation portion about its first end in such a manner that said pipe body fits in the fitting hole through the gate component,
    said checking window is formed radially through the second radial end of the connector housing, and the checking projection component projects into the connector housing through the checking window,
    said holding component is adapted to be prevented from connecting with the outer circumference of said pipe body due to interference between the checking projection component and the annular protruding flange of the pipe body if said pipe body is not fully inserted into said connector housing,
    the holding component further has an auxiliary engagement component including a protrusion extending in the upstream direction along the longitudinal axis of the connector housing, the auxiliary engagement component being formed such that an inner surface thereof is flush with the gate component.

2. The quick connector as set forth in claim 1 wherein the auxiliary engagement component extends up to a downstream portion of the checking projection component along the longitudinal axis of the connector housing.

3. The quick connector as set forth in claim 2 wherein the downstream portion of the checking projection component snap-engages a downstream portion of the checking window along the axis, when the holding component connects with the outer circumference of the pipe body.

4. The quick connector as set forth in claim 1 wherein when the pipe body is housed by the fitting hole, the pipe body biases the gate component and the auxiliary engagement component radially outwardly.

* * * * *